Calvert & Sargent,
Burring Machine.
N° 24,280.  Patented June 7, 1859.
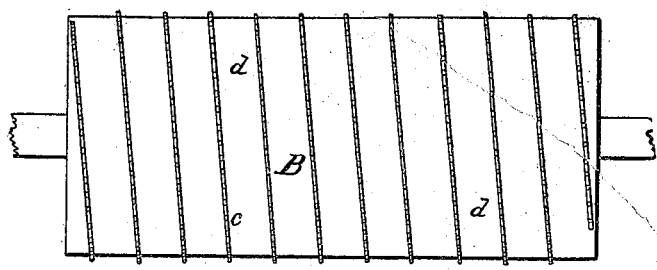
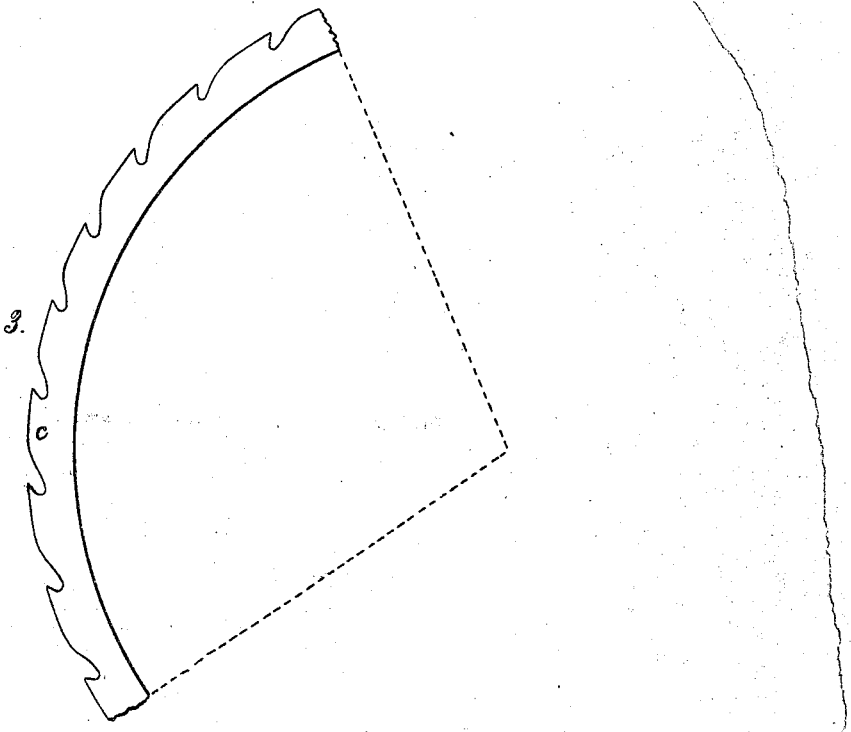
Witnesses.
Inventors.

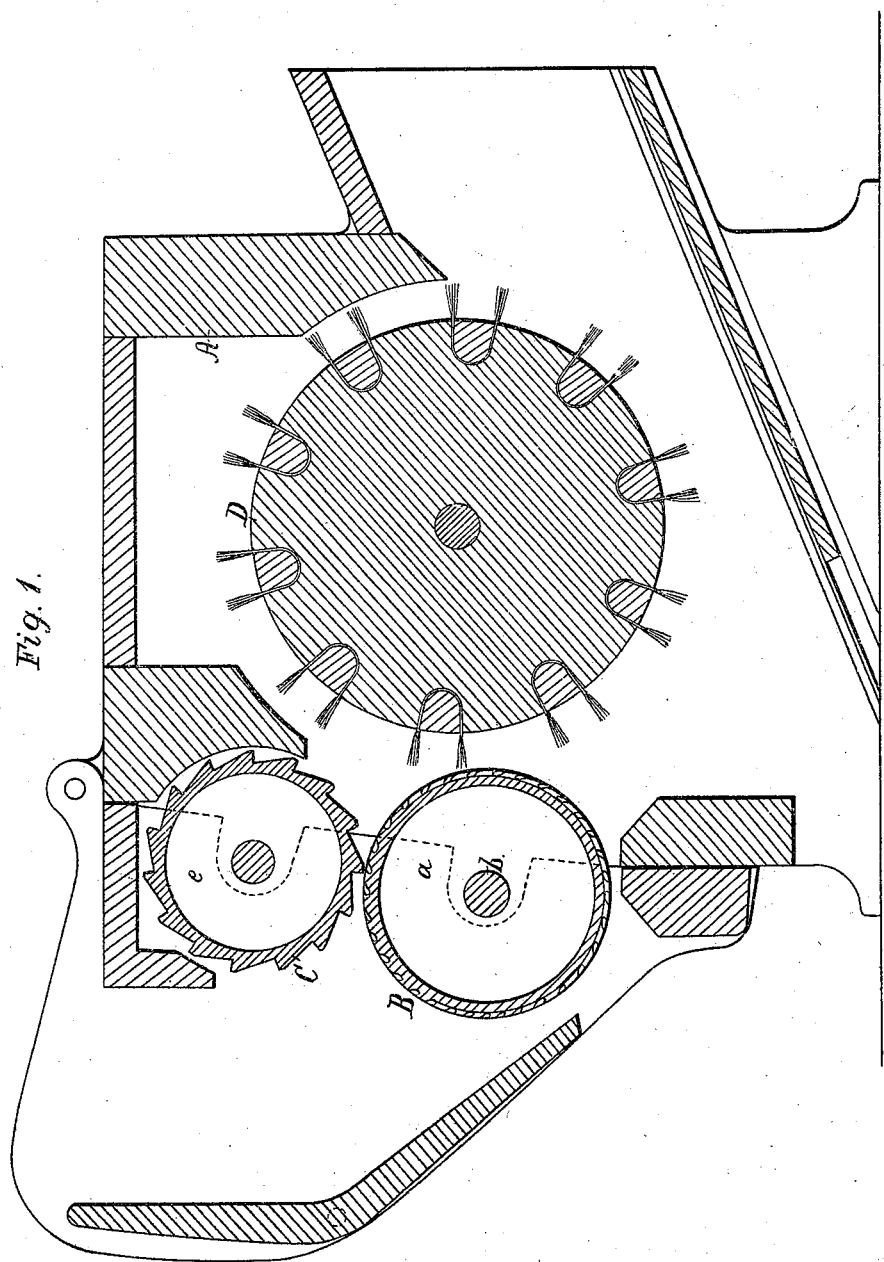

UNITED STATES PATENT OFFICE.

F. A. CALVERT AND CHAS. G. SARGENT, OF LOWELL, MASSACHUSETTS.

MACHINE FOR BURRING WOOL AND GINNING COTTON.

Specification of Letters Patent No. 24,280, dated June 7, 1859.

*To all whom it may concern:*

Be it known that we, FRANCIS A. CALVERT and CHAS. G. SARGENT, of Lowell, in the county of Middlesex and State of Massachusetts, have invented certain improvements in machines for ginning cotton, burring wool, and cleaning other fibrous materials from foreign matter, of which the following is a full, clear, and exact description, reference being had to the accompanying drawings, forming part of this specification, in which—

Figure 1, is a vertical section through a cotton gin with our improved cylinder attached—Fig. 2, is a plan of the cylinder—Fig. 3, detail to be referred to hereafter.

The cylinders heretofore made for the purposes of ginning cotton, burring wool, and cleaning other fibrous materials from foreign matter; and which have been used in connection with a revolving guard, have been so constructed as to keep the seeds, burs, and other foreign substances on the tops of the teeth, thereby rendering the seeds burs &c. liable to be chipped or broken, while the material was in the process of cleaning. Such construction also rendered it difficult for the teeth of the cylinder to take hold of the fibers. Both of these objections have been obviated in our present improved construction of toothed cylinder, the improvement in which consists in forming the cylinder with blank spaces between the rows or circles of teeth of such a width that the seeds, burs &c. shall not bear upon the tops of the teeth, while being operated upon as heretofore; but shall bear upon the blank surfaces of the cylinder when they are brought up to and into contact with the guard. The teeth being raised sufficiently high above the blanks to readily take hold of the fiber, and yet not so high as to leave the distance between the blanks of the cylinder and the edges of the fluted guard so large as to allow the seeds or burs to pass through and be again mingled with the clean fiber.

That others skilled in the art may understand and use our invention we will proceed to describe the manner in which we have carried out the same.

In the said drawings A, represents the frame of a cotton gin—B, our improved toothed cylinder—C the fluted guard—D the brush cylinder of the ordinary construction. These several cylinders are carried in suitable bearings in the frame A, and are driven at the proper relative speeds by cog wheels not shown in the drawings.

The arrangement and construction of the gin itself forming no part of our present invention need not be particularly described. We may however state that we have found the following sizes and speeds of cylinders to give a good result in practice, in a full sized machine.

The cylinder B 7 inches in diameter and driven at the rate of 250 to 300 revolutions per minute. The guard C, 6 inches in diameter, driven at the same rate of speed. The brush cylinder D, 14 inches in diameter, and driven at a little more than twice the speed of the cylinder B.

The cylinder B, is constructed in a manner substantially similar to that described in the Letters Patent granted to Francis A. Calvert on the 23d of January A. D. 1849, for "Improvement in the manufacture of cylinders for burring wool, &c." It is composed of a hollow cast iron cylinder having suitable heads $a$, to receive its shaft $b$. A groove is formed in the periphery of the cylinder, running spirally around it from one end to the other at such a pitch that it will leave the blank spaces $d$ on the surface of the cylinder about five sixteenths of an inch wide. Into this groove is wound a wire $c$, which has been previously notched or serrated as shown in Figs. 1 and 3, the teeth thus formed project about the one sixteenth of an inch above the surface of the cylinders. The wire is secured in the groove by having the metal of the cylinder pressed down over the edge of the wire. We now prefer the best cast steel wire for this purpose.

The guard $c'$, is a hollow cast iron cylinder with suitable heads $e$; the flutes or beating edges are planed out from end to end of it, and are cut about three sixteenths of an inch deep and from three eighths to half an inch from the edge of one flute to the next.

The size above mentioned for the spaces between the rows of teeth is that which we recommend for a cotton gin, they will however require to be varied when operating upon different materials.

We have spoken of the cylinder B, as formed with a toothed wire wound spirally around it; it may be made of toothed disks or rings set in vertical planes; the spiral however is that which we prefer.

Some of the advantages which we claim for this improved construction of cylinder are a reduced cost of construction—increased capability of the machine—less liability to breakage or derangement—and making its repair practicable for any ordinary mechanic.

What we claim as our invention and desire to secure by Letters Patent as an improvement in machines for burring wool and ginning cotton is—

A cylinder, having spaces between the teeth for the accommodation of the seed as set forth, in combination with a revolving guard operating in the manner substantially as described.

In testimony whereof we have hereunto affixed our signatures this eleventh day of December A. D. 1858.

FRS. A. CALVERT.
CHAS. G. SARGENT.

Witnesses:
 THOS. R. ROACH,
 P. E. TESCHEMACHER.